US010154393B2

(12) United States Patent
Friedmann (10) Patent No.: US 10,154,393 B2
(45) Date of Patent: Dec. 11, 2018

(54) METHOD, MOTOR VEHICLE, AND SYSTEM FOR DETERMINING A TRANSMISSION PATH (71) Applicant: Audi AG, Ingolstadt (DE)

(72) Inventor: Felix Friedmann, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/575,543

(22) PCT Filed: May 18, 2016

(86) PCT No.: PCT/EP2016/000822
§ 371 (c)(1),
(2) Date: Nov. 20, 2017

(87) PCT Pub. No.: WO2016/188621
PCT Pub. Date: Dec. 1, 2016

(65) Prior Publication Data
US 2018/0132083 A1 May 10, 2018

(30) Foreign Application Priority Data

May 22, 2015 (DE) ........................ 10 2015 006 674

(51) Int. Cl.
G06F 15/173 (2006.01)
H04W 4/46 (2018.01)
(Continued)

(52) U.S. Cl.
CPC ............ *H04W 4/46* (2018.02); *G08G 1/0965* (2013.01); *G08G 1/0967* (2013.01); *H04L 67/12* (2013.01);
(Continued)

(58) Field of Classification Search
CPC ....... H04W 4/46; H04W 40/18; H04W 84/18; G08G 1/0965; G08G 1/0967; H04L 67/12
See application file for complete search history.

(56) References Cited

U.S. PATENT DOCUMENTS 6,654,681 B1 11/2003 Kiendl et al.
9,998,451 B2 6/2018 Menzel et al.
(Continued)

FOREIGN PATENT DOCUMENTS

CN 102656859 A 9/2012
CN 103200644 A 7/2013
(Continued)

OTHER PUBLICATIONS

International Preliminary Report on Patentability directed to related International Patent Application No. PCT/EP2016/000822, dated Apr. 20, 2017, with attached English-language translation; 16 pages.
(Continued)

*Primary Examiner* — Jonathan A Bui
(74) *Attorney, Agent, or Firm* — Sterne, Kessler, Goldstein & Fox P.L.L.C.

(57) ABSTRACT

The invention relates to a method for determining a communication network for collecting information in the surroundings of a motor vehicle, in which a request message is transmitted, and the request message is received by a first outside vehicle, and a first response message is transmitted by the outside vehicle to the motor vehicle, wherein the request message of each first outside vehicle is transmitted to at least one respective second outside vehicle, wherein a second response message is transmitted by means of the respective second outside vehicle to the first outside vehicle and from there is transmitted to the motor vehicle, wherein a current position of the respective outside vehicle is transmitted with the response messages, and wherein, depending on the response messages, a network plan of the communi-
(Continued)

cation network is determined by the motor vehicle, and on the basis of the network plan, a unique transmission path to one of the outside vehicles is established for another request message of the motor vehicle for collecting information from one of the outside vehicles.

9 Claims, 5 Drawing Sheets (51) Int. Cl.
*H04L 29/08* (2006.01)
*H04W 84/18* (2009.01)
*G08G 1/0965* (2006.01)
*G08G 1/0967* (2006.01)
*H04W 40/18* (2009.01)
*H04H 20/62* (2008.01)

(52) U.S. Cl.
CPC .......... *H04W 40/18* (2013.01); *H04W 84/18* (2013.01); *H04H 20/62* (2013.01)

(56) References Cited

U.S. PATENT DOCUMENTS

| | | | |
|---|---|---|---|
| 2012/0095641 A1 | 4/2012 | Merk | |
| 2013/0079964 A1* | 3/2013 | Sukkarie | G01C 21/3469 701/22 |
| 2013/0099941 A1 | 4/2013 | Jana et al. | |
| 2014/0136658 A1* | 5/2014 | Wahler | H04B 7/18508 709/218 |
| 2015/0063243 A1* | 3/2015 | Bodin | H04W 40/20 370/329 |
| 2015/0092538 A1* | 4/2015 | Vasseur | H04L 45/308 370/225 |
| 2015/0124600 A1* | 5/2015 | Nobauer | H04L 43/0852 370/230 |
| 2015/0339921 A1* | 11/2015 | Hainzlmaier | G08G 1/096811 340/905 |
| 2015/0339923 A1* | 11/2015 | Konig | G08G 1/202 701/522 |
| 2016/0134516 A1* | 5/2016 | Hui | H04L 45/22 370/235 |

FOREIGN PATENT DOCUMENTS

| | | |
|---|---|---|
| CN | 103596238 A | 2/2014 |
| DE | 19903909 A1 | 8/2000 |
| DE | 102010028613 A1 | 11/2010 |
| EP | 1919164 A1 | 5/2008 |
| WO | WO2010130612 A1 | 11/2010 |

OTHER PUBLICATIONS

English-language abstract of European Patent Application Publication No. 1 919 164 A1, published May 7, 2008; 1 page.

Qing Yang, et al., "ACAR: Adaptive Connectivity Aware Routing Protocol for Vehicular Ad Hoc Networks," IEEE, Aug. 3, 2008; 6 pages.

Qing Yang, et al., "ACAR: Adaptive Connectivity Aware Routing for Vehicular Ad Hoc Networks in City Scenarios," Mobile Networks and Applications, May 22, 2009, at 36-60.

Zhaomin Mo, et al., "MURU: A Multi-Flop Routing Protocol for Urban Vehicular Ad Hoc Networks," IEEE, 2006; 8 pages.

International Search Report and Written Opinion of the International Searching Authority directed to related International Patent Application No. PCT/EP2016/000822, dated Jul. 20, 2016, with attached English-language translation; 27 pages.

Yang, Qing, et al., "ACAR: Adaptive Connectivity Aware Routing for Vehicular Ad Hoc Networks in City Scenarios." Springer Science, May 22, 2009; pp. 36-60.

Yang, Qing, et al., "ACAR: Adaptive Connectivity Aware Routing for Protocol for Vehicular Ad Hoc Networks." IEEE, Aug. 7, 2008; 6 Pages.

* cited by examiner

METHOD, MOTOR VEHICLE, AND SYSTEM FOR DETERMINING A TRANSMISSION PATH

TECHNICAL FIELD

The invention relates to a method for determining a communication network for collecting information in the surroundings of a motor vehicle. A request message is transmitted by a communication unit of the motor vehicle. The request message is received by a respective communication unit of at least one first outside vehicle. A first response message is transmitted to the communication unit of the motor vehicle via the respective communication unit of the outside vehicle. The invention also relates to a motor vehicle with a communication unit as well as a system with a motor vehicle.

BACKGROUND

Methods of determining a communication network for collecting information are known from the prior art. For example, vehicles can exchange information directly with an external server outside the vehicle by wireless radio links or indirectly via a mobile radio link. Vehicles can thus gain access to the sensor data of other vehicles.

For example, vehicle-to-X communications are known. DE 10 2010 028 613 A1 discloses a communication device having wireless key-to-X communication. The wireless key-to-X communication can be utilized between two vehicles equipped with this radio key communication technology in order to communicate data such as positions, weather conditions, or warnings.

US 2012/0095641 A1 describes a method for wireless communication between vehicles. Driving information about the surroundings of a second vehicle is transmitted from the second vehicle to a first vehicle.

EP 1 919 164 A1 describes a method for collecting data in a requesting vehicle. A destination region is determined. The destination region is subdivided into overlapping subareas. For each subarea, a data packet is transmitted to a vehicle in the subarea. The data packet comprises a request. Finally, data as responses to the requested data packet are transmitted from the subareas to the requesting vehicle.

One disadvantage of the prior art is that mobile radio links function only when both vehicles are in a region where mobile radio is available with a connection of a sufficient quality. This is usually impossible in rural regions or in isolated areas, such as in an underground garage or a tunnel or during natural catastrophes. Direct wireless connection between two vehicles is usually subject to a greatly restricted range.

DE 199 03 909 A1 describes a method for obtaining relevant traffic information and for dynamic optimization of a route of a vehicle belonging to a self-organizing traffic control system. In this method, the vehicle first generates data based on sensors inherent in the vehicle or from other information sources. Then relevant data for the vehicle or other vehicles are transmitted, and the transmitted data from the other vehicles are received and saved. Finally, requests are generated and sent by the vehicle with respect to data that could be supplied by other vehicles.

US 2013/0099941 A1 discloses a vehicle-to-vehicle communication and a vehicle-to-X communication, wherein a vehicle travels along a route, requesting information from other vehicles or units. This information may be traffic information, for example.

DETAILED DESCRIPTION

The object of the invention is to provide a method, a vehicle, and a system with or in which a communication network for collecting information can be determined more reliably and with a greater range.

This object is achieved according to the invention by a method, a vehicle, and a system having the features according to the respective independent claims.

In a method according to the invention, a communication network for collecting information in the surroundings of a motor vehicle is determined. A request message is transmitted by means of a communication unit in the motor vehicle. The request message is received by a respective communication unit of at least one first outside vehicle. A first response message is transmitted to the communication unit of the motor vehicle by the respective communication unit of the outside vehicle. As an essential aspect of the invention, the request message is transmitted to a communication unit of at least one respective second outside vehicle by means of the communication unit of each first outside vehicle. A second response message is transmitted to the communication unit of the first outside vehicle and from there to the communication unit of the motor vehicle by means of the communication unit of the respective outside vehicle. At least one current position of the respective outside vehicle is transmitted with the response messages. A network plan of the communication network is determined by at least the motor vehicle as a function of the response messages. In addition, a unique transmission path to one of the outside vehicles is defined for another request message of the motor vehicle for collecting the information from one of the outside vehicles.

The method according to the invention makes it possible for the communication network to collect the information to be provided more reliably and in a larger region or surroundings.

The term "motor vehicle" is used to describe the subject vehicle in question, while the term "outside vehicle" is used to refer to other vehicles in the surroundings of the subject vehicle in question. The "at least one first outside vehicle"

thus describes a group of outside vehicles receiving the request message directly from the motor vehicle. The "at least one second outside vehicle" describes a group of outside vehicles receiving the request message directly from one of the first outside vehicles and thus receiving the request message only indirectly from the motor vehicle. The request message and the response messages are transmitted in particular via a wireless radio link provided by the respective communication units. The design of a wireless radio link is different in particular from that of a mobile radio link. The radio link is thus preferably operated according to a WLAN standard or a car-to-car standard instead of being operated according to a mobile radio standard, for example. This is advantageous because, in this way, the communication network can also be provided in regions without mobile radio telephone service.

The first request messages are transmitted in particular in the form of a broadcast message. When the network plan has been determined, the unique transmission path for the additional request message of the motor vehicle for collecting the information can be defined on this basis. Certain outside vehicles, which either collect or provide the information, or which only forward the information, can now be addressed by the unique transmission paths because the outside vehicles that provide the information are too far away from the motor vehicle in order to be able to transmit this information directly to the motor vehicle.

The collected information may comprise a plurality of sensor data of the respective outside vehicle. The sensor data may thus provide, for example, information about traffic problems or accidents in the surrounding area of one of the outside vehicles. In addition, the sensor data of the respective outside vehicle can also be utilized, for example, for searching for a parking place. The specific information to be acquired with the additional request message can be defined by the motor vehicle, in particular as a function of a network property of the communication network. Because the information is acquired over the unique transmission path, image data can also be transmitted as the information. Thus, for example, images from a camera of an outside vehicle can also be transmitted to the motor vehicle via the unique transmission path.

The collected information may also be utilized, for example, to determine the current situation with regard to parking options, pedestrian density, bicycle density, or the presence of certain objects, in particular service trucks, charging stations for electric vehicles, or devices capable of communication for identification of buildings, for example, banks, service stations, or workshops in the surrounding area of the respective outside vehicle.

According to the invention, a network property of the communication network is determined for evaluation of the communication network by the motor vehicle, and the transmission path is established on the basis of this network property of the transmission path. For example, a spatial coverage of the communication network or a transmission quality of the motor vehicle relative to one of the outside vehicles can be determined through the network property. For example, the motor vehicle sends the request message without a specific receiver, i.e., without directing the message at a specific outside vehicle, and each outside vehicle receiving the request message, and in particular each outside vehicle that has not already previously received the message, distributes it further and also sends a response message. The respective response message is transmitted to the motor vehicle with connection properties or connection characteristics, for example, with the data throughput between the outside vehicles. Thus, after arrival of the response messages at the motor vehicle, the network property of the communication network can be determined. On the basis of the network property, the best connections between the motor vehicle and the outside vehicles, or the outside vehicles among one another, can be found, which will fulfill the requirements of specific applications, for example, with regard to transmission rate, time lag, or stability. According to the invention, a probability is estimated here, namely the probability that the additional request message for the implementation of a specific task by the motor vehicle is forwarded to the second outside vehicle, the outside vehicle in the target region, or the target outside vehicle via the first outside vehicle. The second outside vehicle is equipped with the necessary sensors, for example, in order to provide the information requested with the additional request message. The information from the outside vehicle in the target region can be transmitted back via the outside vehicles, which are still in the communication network. On the basis of this probability, it is possible for the motor vehicle to decide whether the additional request message or the assignment is to be output. Thus, after determining the network property, the additional request message can be transmitted, for example, over a defined connection between the outside vehicles, in which specific outside vehicles are to be taken into account for transmission of the request message or the response message. Thus, for example, with the defined connection, a sequence of outside vehicles, in which the connection must forward the information, can also be established as the defined connection. Additionally or alternatively, an undefined connection may also be provided between the outside vehicles. Thus, for example, a destination and a remote logic may also be transmitted or may be stored in the respective outside vehicles. The remote logic can then define under which circumstances the additional request message is to be discarded. This may be done, for example, when one of the outside vehicles is too far away from the direct transmission path to the destination. In addition, a mixture of a defined connection and an undefined connection is also possible as a partially defined connection.

In addition, the respective request message is transmitted further to additional outside vehicles as a function of at least one restriction criterion. For example, the restriction criterion can be described with respect to the distance between the motor vehicle and one of the outside vehicles (for example, as being less than 100 kilometers), a location, a connection quality, a transmission quality, or a maximum number of outside vehicles to be connected. The expansion of the communication network can be controlled or limited by the restriction criterion. Outside vehicles receiving the request message can verify whether one of the restriction criteria is violated and can discard the request message, if necessary, based on information contained in the request message.

In addition, the communication unit of the first outside vehicle will wait for reception of the second response message from the second outside vehicle before transmitting the first response message, where the second response message is included in the transmission of the first response message. This is advantageous because in this way the number of simultaneously active connections can be reduced. Thus, the required capacity of the wireless radio link for transmitting the response messages can be provided more reliably.

The network plan of the communication network is adapted on the basis of the response messages in predetermined intervals of time, in particular by the motor vehicle.

Thus, for example, trip information for the respective outside vehicle can be transmitted together with the response messages. The trip information may be, for example, information from the navigation device in the respective outside vehicle or may include information about the destination of the trip by the respective outside vehicle. Thus, for example, it is possible to predict when a respective outside vehicle will be at a certain location also based on the speed of the respective outside vehicle. Thus, for example, it is also possible to determine whether or not the respective outside vehicle will be within the communication network at a predetermined time of day. The network time of the communication network is thus extrapolated on the basis of the response messages. The predetermined intervals of time in which the network plan is adapted can be determined, for example, with regard to the spatial extent of the communication network. The adaptation of the network plan is carried out by the motor vehicle in particular. However, the network plan may be transmitted to another device, for example, an external server, and the network plan may be adapted there. By adapting the network plan, it is also possible to make predictions about what the network plan may be like at a certain point in time in the future.

In addition, it is provided in particular that, of the information, at least travel information relating to the outside vehicle or sensor information from the outside vehicle is included. Thus, for example, of the travel information of the outside vehicle, the destination or speed of the outside vehicle is included, and this data may be made available, for example, by a navigation device in the respective outside vehicle. For example, sensor data of a sensor for the surroundings, for example, of a camera, a radar sensor, an ultrasonic sensor, or a Lidar sensor may be included in the sensor information. However, other sensor data such as, for example, a yaw, pitch, or roll rate of the outside vehicle may also be included. However, it is also possible to transmit only the sensor equipment of the respective outside vehicle to thereby show the motor vehicle which information can be provided at all. From the travel information or the route characteristic of the respective outside vehicle, it is also possible for the acceleration of the outside vehicle or the estimated route of travel of the outside vehicle to be described.

In addition, the network plan may be transmitted to at least one of the outside vehicles or one external server outside of the vehicle. This can be helpful because the network plan then need no longer be determined by each one of the outside vehicles itself. It is thus possible to also access the network plan of the communication network determined by the motor vehicle by means of the outside vehicles. For example, calculation efforts in the motor vehicle can be reduced by transmitting the network plan to the external server outside of the vehicle. The adaptation of the network plan can thus be taken over by the external server in the predetermined intervals, for example. Furthermore, other network plans from other motor vehicles can also be merged together in the external server. In merging, the network plans can also be subjected to a plausibility check, for example, and improved or checked for errors. Furthermore, in the transmission of the network plan from one external server to another external server, for example, a mobile radio link can be used to bridge greater distances.

The invention also relates to a motor vehicle having a communication device. The motor vehicle is designed to send request messages to outside vehicles, to receive response messages from outside vehicles, to determine a network plan of a communication network as a function thereof, and to determine a unique transmission path for additional request messages of the motor vehicle for collecting information on the basis of the network plan.

Furthermore, the invention relates to a system having a motor vehicle according to the invention and at least one outside vehicle with a communication unit. The system is designed to carry out a method according to the invention.

The system comprises an external server that is designed to provide the network plan transmitted by the motor vehicle for the outside vehicles. The network plan can be utilized in this way not only by the motor vehicle itself, but also by the outside vehicles by way of the external server. In this way, for example, the outside vehicle would not have to determine the network plan itself, whether or not it was capable of determining the network plan. With the network plan, the outside vehicle can then establish a unique transmission path itself for an additional request message for collecting information.

The preferred embodiments and the advantages of the method according to the invention are applicable for the motor vehicle according to the invention and for the system according to the invention.

Additional features of the invention are derived from the claims, the figures, and the description of the figures. The features and combinations of features described in the description and illustrated in the figures can be used not only in the specific combination given but also in other combinations or alone without going beyond the scope of the invention. Embodiments of the invention not shown explicitly in the figures or described with respect to them are to be considered as disclosed and included but are derived from and can be created from the illustrated embodiments through separate combinations of features. Embodiments and combinations of features that do not have all the features of an independent claim as originally formulated are also to be regarded as disclosed.

The exemplary embodiments of the invention are explained in greater detail below with reference to schematic diagrams.

Figure 1:
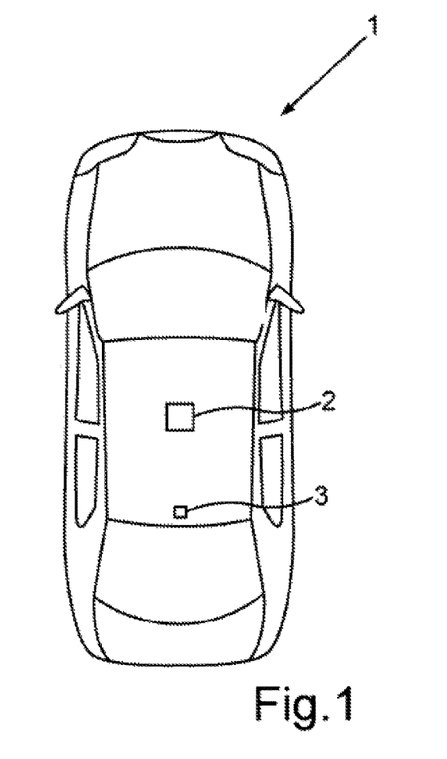
FIG. 1 illustrates a schematic diagram of one embodiment of a motor vehicle according to the invention with a communication unit.
Figure 2:
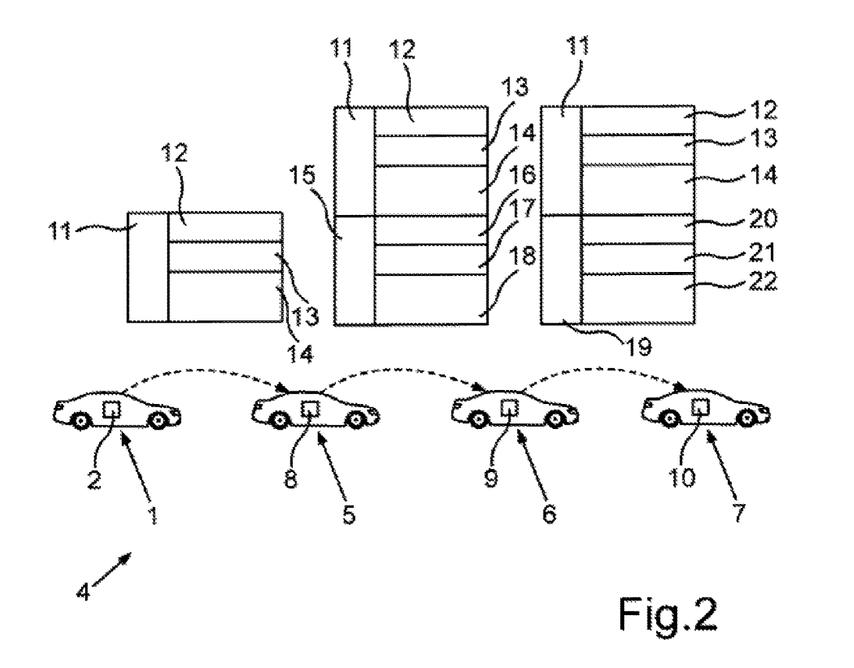
FIG. 2 illustrates a schematic diagram of one embodiment of a system according to the invention with the motor vehicle transmitting a request message to an outside vehicle.
Figure 3:
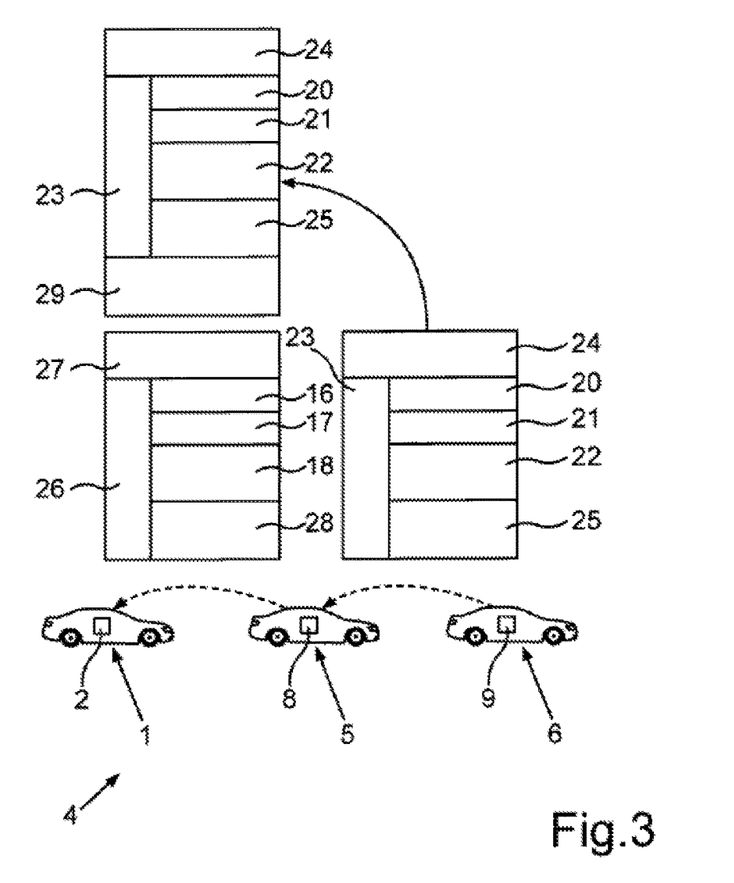
FIG. 3 illustrates a schematic diagram of the system with the motor vehicle receiving a response message from an outside vehicle.
Figure 4:
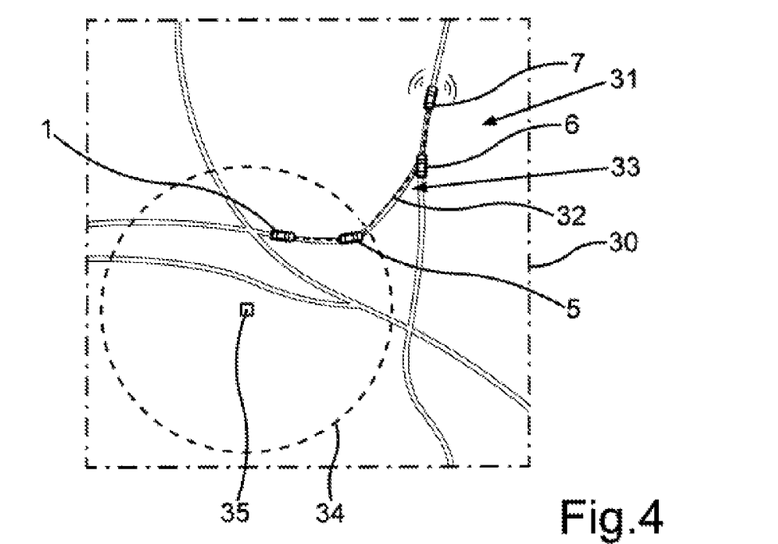
FIG. 4 illustrates a schematic diagram of a network plan of a communication network that is determined by the motor vehicle.
Figure 5:
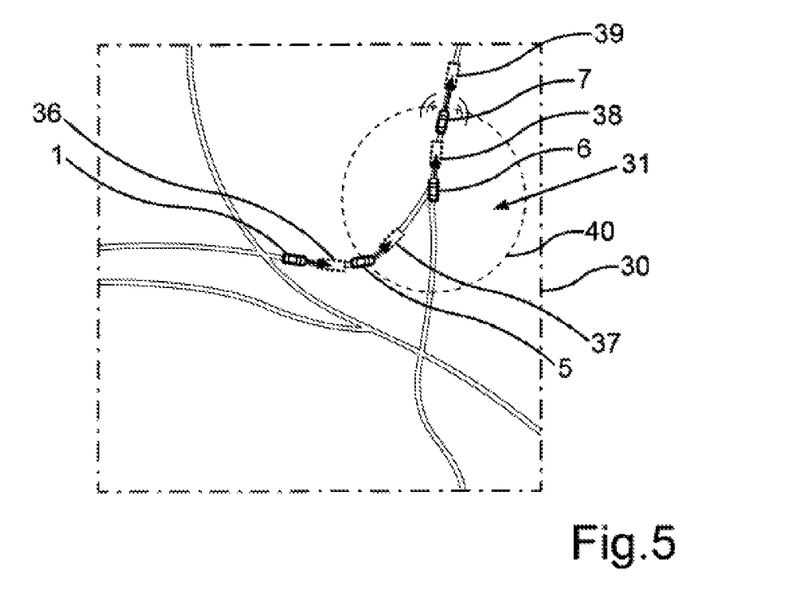
FIG. 5 illustrates a schematic diagram of the network plan of the communication network adapted on the basis of the response messages.
Figure 6:
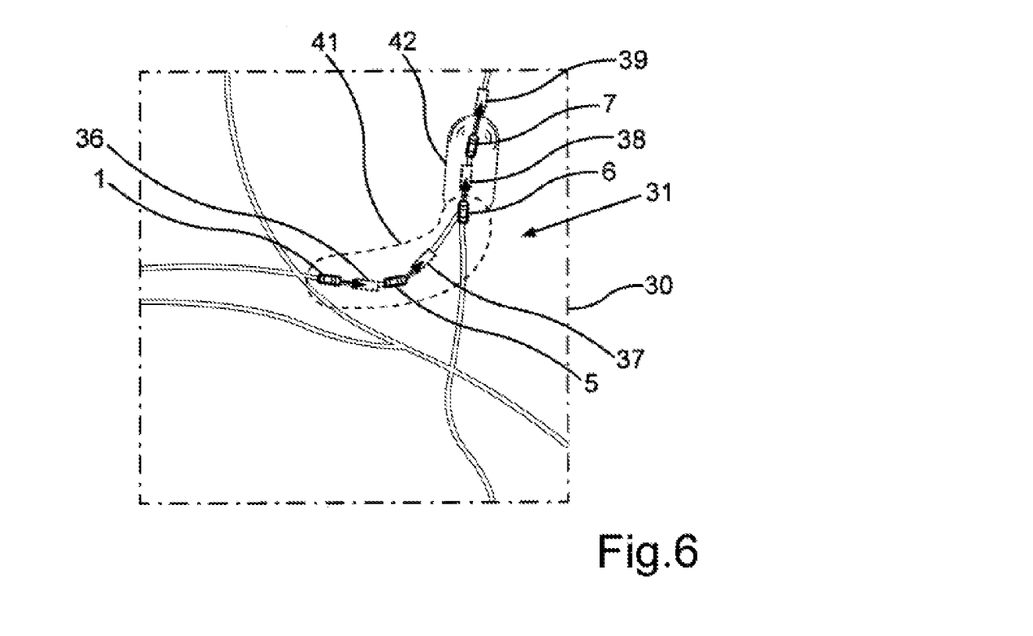
FIG. 6 illustrates a schematic diagram of the network plan with a network property for evaluation of the communication network.

In the drawings:

FIG. 1 shows a schematic diagram of one embodiment of a motor vehicle according to the invention with a communication unit;

FIG. 2 shows a schematic diagram of one embodiment of a system according to the invention with the motor vehicle transmitting a request message to an outside vehicle;

FIG. 3 shows a schematic diagram of the system with the motor vehicle receiving a response message from an outside vehicle;

FIG. 4 shows a schematic diagram of a network plan of a communication network that is determined by the motor vehicle;

FIG. 5 shows a schematic diagram of the network plan of the communication network adapted on the basis of the response messages; and FIG. 6 shows a schematic diagram of the network plan with a network property for evaluation of the communication network.

The same elements or those having the same function are labeled with the same reference numerals in the figures.

FIG. 1 shows schematically a motor vehicle 1 having a communication unit 2. The communication unit 2 is designed to send request messages to outside vehicles or receive response messages from outside vehicles. The communication unit 2 preferably uses a wireless radio link for this purpose. The wireless radio link may be operated as a mobile radio link, for example, according to the GSM, UMTS, or LTE standard. The wireless radio link of the communication unit 2 is preferably to other communication units using standards other than GSM, UMTS, or LTE. The arrangement of the communication unit 2 on the motor vehicle 1 is possible in a variety of ways. According to the exemplary embodiment, the motor vehicle 1 additionally comprises a GNSS receiver 3 to determine the position of the motor vehicle. In addition, the communication unit 2 may also be designed to establish a link to an external server (not presented in detail here) outside of the vehicle. The communication unit 2 also includes a computer device. The computer device may be integrated into the communication unit 2 or designed separately from the communication unit 2.

FIG. 2 shows a system 4 with the motor vehicle 1, a group of first outside vehicles 5, a group of second outside vehicles 6, and a group of third outside vehicles 7. A group of motor vehicles is described through the first outside vehicle 5, the second outside vehicle 6, and the third outside vehicle 7. The first outside vehicles 5 each have a communication unit 8. The second outside vehicles 6 each have a communication unit 9. In addition, the third outside vehicles 7 each have a communication unit 10. The motor vehicle 1 then sends by means of the communication unit 2 a request message 11. The request message 11 includes a transaction ID 12, a time stamp 13 of the motor vehicle 1, and trip information 14 from the motor vehicle 1. The request message 11 is received by the communication unit 8 of the first outside vehicle 5. On the basis of the transaction ID 12, the first outside vehicle 5 can verify whether it has already received this request message 11 with this transaction ID 12 and may optionally discard it. A restriction criterion on the basis of which first outside vehicle 5 can verify whether the request message 11 fulfills this restriction criterion can also be transmitted with the request message 11.

If the request message 11 is also accepted by the first outside vehicle 5, then the request message 11 together with a transmitter identity 15 of the first outside vehicle 5 is additionally sent out. The transmitter identity 15 includes a time stamp 16 of the first outside vehicle 5, a vehicle ID 17 of the first outside vehicle 5, and trip information 18 from the first outside vehicle 5. The request message 11 is received together with the transmitter identity 15 from at least one of the second outside vehicles 6 by means of the respective communication unit 9. Reception of the request message 11 by the second outside vehicle 6 is also linked to the restriction criterion. Further transmission of the request message 11 by the second outside vehicle 6 is also linked to the restriction criterion. If the request message 11 is thus forwarded by the second outside vehicle 6, this happens together with a transmitter identity 19 of the second outside vehicle 6. The transmitter identity 19 of the second outside vehicle 6 includes a time stamp 20 of the second outside vehicle 6, a vehicle ID 21 of the second outside vehicle 6, and trip information 22 from the second outside vehicle 6. For example, a position, a speed, an acceleration, a navigation destination, or an estimated route of the respective outside vehicle 5, 6, 7 is described by the respective trip information 14, 22 or the route characteristics of the respective outside vehicle 5, 6, 7. The respective vehicle ID 17, 21 can be generated randomly, for example. The respective outside vehicle 5, 6, 7 can be allocated uniquely in particular by the respective transmitter identity 15, 19. Outside vehicles 5, 6, 7 receiving the request message 11 together with the transmitter identities 15, 19 of another outside vehicle 5, 6, 7 replace the transmitter identity 15, 19 with their own before they forward the request message 11.

FIG. 3 next shows how the second outside vehicle 6 transmits a second response message 23 to the first outside vehicle 5. The second response message 23 comprises a response message transaction ID 24 as well as the time stamp 20 of the second outside vehicle 6, the vehicle ID 21 of the second outside vehicle 6, and the trip information 22 of the second outside vehicle 6. In addition, the second response message 23 includes sensor information 25 from the second outside vehicle 6. The sensor information 25 describes, for example, which sensor equipment the second outside vehicle 6 has or whether a mobile radio link is available. The second response message 23 is transmitted by the first outside vehicle 5 preferably together with a first response message 26 to the communication unit 2 of the motor vehicle 1. The first response message 26 includes a request message transaction ID 27, the time stamp 16 of the first outside vehicle 5, the vehicle ID 17 of the first outside vehicle 5, the trip information 18 of the first outside vehicle 5, and sensor information 28 of the first outside vehicle 5. In addition to the second response message 23, a connection property 29, which indicates an evaluation for the data throughput between the first outside vehicle 5 and the second outside vehicle 6 is transmitted in addition to the second response message 23.

FIG. 4 now shows how a network plan 30 of a communication network 31 can be determined as a function of the response messages 23, 26. The network plan 30 thus shows the communication network 31 consisting of the motor vehicle 1, the first outside vehicle 5, the second outside vehicle 6, and the third outside vehicle 7. The motor vehicle 1 can receive information, for example, the sensor information 25, 28 of the respective outside vehicle 5, 6, 7 via the communication network 31. It is thus provided first in particular that the request message 11 be transmitted without direction in order to then determine the network plan 30 on the basis of the response messages 23, 26. A unique transmission path 32 for an additional request message 33 of the motor vehicle 1 can then be established for collecting the information via the network plan 30. The additional request message 33 can then also be transmitted to the third outside vehicle 7 if the third outside vehicle 7 is outside of the range 34 of the mobile radio towers 35. Thus a transmission chain can be formed to transmit the additional request message 33 from the motor vehicle 1 to the third outside vehicle 7 by means of first and second outside vehicles 5, 6, which are situated between the motor vehicle 1 and the third outside vehicle 7, and to acquire the requested sensor information or other information about the region situated in the surrounding area of the third outside vehicle 7.

The network plan 30 is additionally provided with a network property of the communication network 31 for evaluation of the communication network. On the basis of this network property, the unique transmission path 32 can be established. For example, a spatial coverage or a transmission quality of the communication network 31 can be described through the network property.

FIG. 5 shows how the network plan 30 is adapted on the basis of the trip information 18, 22 transmitted by means of the response messages 23, 26 in predetermined intervals of time. The network plan 30 can thus be extrapolated, so that a prediction for a future position of the motor vehicle 1 or of the respective outside vehicle 5, 6, 7 is determined. Thus, for example, a future position 36 is determined for the motor vehicle 1, while a future position 37 is determined for the first outside vehicle 5, a future position 38 is determined for the second outside vehicle 6, and a future position 39 is determined for the third outside vehicle 7. The future positions 36, 37, 38, 39 can be determined in particular on the basis of the trip information 18, 22. The trip information 18, 22 includes, for example, a speed, an acceleration, or a navigation destination of the motor vehicle 1 or of the respective outside vehicle 5, 6, 7. Thus, when the second outside vehicle 6 has reached the future position, the third outside vehicle 7 is already in the future position 39 and thus is outside of the range 40 of the wireless connection of the communication unit 9 of the second outside vehicle 6.

FIG. 6 shows how the network diagram 30 describes the network property, in particular the network stability, of the communications network 31 in accordance with the adaptation at the predetermined time intervals, i.e., the predicted movement of the outside vehicles 5, 6, 7. Thus, for a first region 41, no collapse in network stability is to be expected because the motor vehicle 1 and the outside vehicles 5, 6, 7 are within their respective transmission ranges of the respective communication units 2, 8, 9, 10. However, a restricted network quality is to be expected for a second region 42 because the third outside vehicle 7 will be outside of the transmission range of the first outside vehicle 5 with its future position 39 in the next step. However, the communication network also moves to the current position 38 from the third outside vehicle 7, and the second outside vehicle 6 will reach the location in the future, thus providing partial stability. The direction in which the communication network 31 is moving is determined in particular by the movement of the motor vehicle 1.

The method thus proceeds as follows, for example. The request message 11 is sent out by the motor vehicle 1 and received by the respective first outside vehicle 5, which sends the request message 11 further to the respective second outside vehicle 6 as a function of the restriction criterion. The second outside vehicle 6 in turn sends the request message 11 further to the respective third outside vehicle 7 if the termination of the restriction criterion is met. Then the response messages 23, 26 are transmitted back to the motor vehicle 1, and the motor vehicle 1 can determine the network plan 30 of the communication network 31. In addition, the motor vehicle 1 can also determine the network properties of the network plan 30. Then, on the basis of the network properties, the best connection in particular for the unique transmission path 32 between the outside vehicles 5, 6, 7 can be ascertained. The best connection can be selected as a function of whether the requirements of specific applications are met with regard to the transmission rate, time lag, or stability. It is also possible to estimate a probability of the additional request message 33 for executing a specific task, for example, detection and return of information from the region of the respective outside vehicle, from the motor vehicle 1 via the outside vehicles 5, 6, 7 to a target outside vehicle of the outside vehicles 5, 6, 7. Then the information, ascertained on the basis of the task that has been carried out, is sent back to the motor vehicle 1 via the intermediate outside vehicles 5, 6, 7 before one of the intermediate outside vehicles 5, 6, 7 leaves the communication network. Based on this probability, it is then possible for the motor vehicle 1 to decide whether or not a task is to be output.

The request message 11 and the response messages 23, 26 are both transmitted in particular over a wireless connection, which is different from a mobile radio link. However, a mobile radio link may also be used, for example, to cover greater distances. This method can also be combined, for example, with stationary or mobile radio stations, which are not supplied by outside vehicles 5, 6, 7. These radio stations or node points can fulfill simple amplification tasks, for example, and merely increase the range of sending or receiving outside vehicles 5, 6, 7.

The network property of the communication network can also be determined, for example, by intermediate outside vehicles 5, 6, 7 and not just in the motor vehicle 1. Thus, for example, the network property of the communication network 31, which is determined by the respective outside vehicle 5, 6, 7 can also be sent back with the respective response message 23, 26 to the motor vehicle 1. This makes it possible, for example, to prevent overloading the motor vehicle 1 with the response messages 23, 26, and to reduce the volume of data that must be transmitted in the communication network 31.

Thus, the communication network 31, which can act independently of mobile radio towers, may be made available. In addition, no permanent connection between the motor vehicle and the respective outside vehicle 5, 6, 7 is necessary in the communication network 31. The detection of the network property, the determination of the network plan, the issuance of tasks, or the further request message 33 may be repeated if necessary. Furthermore, the communication network 31 may be made available in such a way that it does not depend on a central infrastructure. This increases security because data cannot be tapped into centrally and therefore no failure of central infrastructure can occur.

The motor vehicle 1 can conclude the detection of the network properties or the determination of the network plan 30 if a predetermined period of time is exceeded or if no new response message 23, 26 has been received from the motor vehicle 1 within a predetermined period of time.

A request can be made over the unique transmission path 32, or over an undefined or a partially defined connection, for the further request message 33 or for the issuance of a task and the return of results or further response messages. Over the unique transmission path 32, the motor vehicle 1 sends a list of outside vehicles 5, 6, 7 organized according to rank, together with the issuance of a task. Each vehicle receiving the data of the additional request message 33 will search for its ID in the list and forward the data to the vehicle with the next ID in the list. When sending back results, the vehicles forward the results to the previous entry in the list accordingly.

Data transmission of information over an undefined connection is carried out in the same way as the detection of the network properties or the determination of the network plan 30. In this particular case, however, a destination of the target outside vehicle of the outside vehicles is also transmitted. Likewise, a logic can also be transmitted, by means of which it is possible to ensure that the data with the task can slowly approach the target location and can later be sent back to the motor vehicle 1.

In the case of a partially defined transmission or connection, not all the intermediate outside vehicles 5, 6, 7 will have been defined from the outset or a defined transmission over the unique transmission path 32 will have developed into a partially defined transmission, because the defined connection cannot be maintained. This case may occur, for example, when one of the outside vehicles 5, 6, 7 leaves the communication network 31 unexpectedly.

If the communication network 31 has been detected and a rapid and stable transmission has been enabled for the additional request message 33, depending on the network properties, then large volumes of data can be transmitted reliably, for example, by jumping or hopping over the outside vehicles 5, 6, 7, in particular, at a predetermined point in time.

The invention claimed is:

1. A method for determining a network property of a unique transmission path of a communication network for collecting information in surroundings of a motor vehicle, comprising:
   transmitting a request message by a communication unit of the motor vehicle, the communication unit of the motor vehicle including a first computer device;
   receiving the request message by a communication unit of a first outside vehicle, the communication unit of the first outside vehicle including a second computer device;
   transmitting the request message by the communication unit of the first outside vehicle to a communication unit of a second outside vehicle, the communication unit of the second outside vehicle including a third computer device;
   transmitting a first response message to the communication unit of the motor vehicle by the communication unit of the first outside vehicle;
   transmitting a second response message to the communication unit of the first outside vehicle by the communication unit of the second outside vehicle;
   transmitting the second response message from a transmitting outside vehicle to the communication unit of the motor vehicle, wherein the transmitting outside vehicle is the first outside vehicle, the second outside vehicle, or an additional outside vehicle, wherein a current position of the transmitting outside vehicle is transmitted from the transmitting outside vehicle with the second response message;
   determining, depending on the first and second response messages, a network plan of the communication network by the motor vehicle;
   establishing, based on the network plan, the unique transmission path to the first outside vehicle, the second outside vehicle, or the additional outside vehicle, for an additional request message of the motor vehicle for collecting the information from one of the first outside vehicle, the second outside vehicle, or the additional outside vehicle;
   determining, based on the unique transmission path, the network property of the unique transmission path of the communication network for evaluation of the communication network by the motor vehicle;
   estimating, based on the network property of the unique transmission path of the communication network, a probability that the additional request message will be forwarded to the second outside vehicle via the first outside vehicle for carrying out a specific task by the motor vehicle; and
   establishing, based on the network property of the unique transmission path, the communication network.

2. The method according to claim 1, further comprising:
   transmitting the request message further to a plurality of additional outside vehicles as a function of a restriction criterion, wherein the restriction criterion is described with respect to a distance between the motor vehicle and one of the plurality of additional outside vehicles, a location, a transmission quality, or a maximum number of the plurality of additional outside vehicles to be connected.

3. The method according to claim 1, further comprising:
   waiting, by the communication unit of the first outside vehicle, for reception of the second response message from the second outside vehicle before transmitting the first response message, and
   transmitting the second response message with the first response message.

4. The method according to claim 1, further comprising:
   adapting, by the motor vehicle, the network plan of the communication network, based on the response messages, in predetermined intervals of time.

5. The method according to claim 1, wherein the information includes at least trip information or sensor information of the first outside vehicle, the second outside vehicle, or the additional outside vehicle.

6. The method according to claim 1, further comprising:
   transmitting the network plan to the first outside vehicle, the second outside vehicle, or the additional outside vehicle, or to an external server separate from the first outside vehicle, the second outside vehicle, and the additional outside vehicle.

7. A motor vehicle, comprising:
   a communication unit, the communication unit including a computer device, wherein the communication unit is configured to:
     send request messages to one or more outside vehicles;
     receive response messages from the one or more outside vehicles;
     determine, as a function of the response messages from the one or more outside vehicles, a network plan of a communication network;
     determine, based on the network plan, a unique transmission path for one or more additional request messages of the motor vehicle for collecting information;
     determine, based on the unique transmission path of the communication network, a network property of the unique transmission path of the communication network for evaluation of the communication network;
     estimate, based on the network property of the unique transmission path of the communication network, a probability that the one or more additional request messages will be forwarded to a second outside vehicle via a first outside vehicle for carrying out a specific task by the motor vehicle; and
     establish, based on the network property of the unique transmission path, the communication network.

8. A system, comprising:
   a motor vehicle; and
   one or more outside vehicles, each with a respective communication unit, each respective communication unit including a respective computer device, configured to:
     send request messages to the one or more outside vehicles;
     receive response messages from the one or more outside vehicles;
     determine, as a function of the response messages from the one or more outside vehicles, a network plan of a communication network;
     determine, based on the network plan, a unique transmission path for one or more additional request messages of the motor vehicle for collecting information;
     determine, based on the unique transmission path, a network property of the unique transmission path of the communication network for evaluation of the communication network;
     estimate, based on the network property of the unique transmission path of the communication network, a probability that the one or more additional request messages will be forwarded to a second outside vehicle via a first outside vehicle for carrying out a specific task by the motor vehicle; and establish, based on the network property of the unique transmission path, the communication network.

9. The system according to claim 8, further comprising:

an external server, which is separate from the motor vehicle, the one or more outside vehicles, the first outside vehicle, and the second outside vehicle, the external server configured to:

provide the network plan transmitted by the motor vehicle for the one or more outside vehicles, the first outside vehicle, and the second outside vehicle.

* * * * *